United States Patent
Tseng et al.

(10) Patent No.: US 9,886,567 B2
(45) Date of Patent: Feb. 6, 2018

(54) DISPLAY DYNAMIC CONTENTS ON LOCKED SCREENS

(75) Inventors: Erick Tseng, San Francisco, CA (US); Matthew Cahill, Burlingame, CA (US)

(73) Assignee: Facebook, Inc., Menlo Park, CA (US)

( * ) Notice: Subject to any disclaimer, the term of this patent is extended or adjusted under 35 U.S.C. 154(b) by 641 days.

(21) Appl. No.: 13/168,598

(22) Filed: Jun. 24, 2011

(65) Prior Publication Data

US 2012/0331548 A1 Dec. 27, 2012

(51) Int. Cl.
*G06F 21/31* (2013.01)
*G06F 1/32* (2006.01)
*H04M 1/67* (2006.01)
*H04M 1/725* (2006.01)

(52) U.S. Cl.
CPC .............. *G06F 21/31* (2013.01); *H04M 1/67* (2013.01); *G06F 1/3206* (2013.01); *G06F 1/3265* (2013.01); *H04M 1/72552* (2013.01); *Y02B 60/1242* (2013.01)

(58) Field of Classification Search
USPC ............................................ 726/19; 713/300
See application file for complete search history.

(56) References Cited

U.S. PATENT DOCUMENTS

| 7,669,123 | B2 | 2/2010 | Zuckerberg | |
|---|---|---|---|---|
| 2008/0070209 | A1* | 3/2008 | Zhuang | G06Q 30/02 434/236 |
| 2008/0254774 | A1 | 10/2008 | Lee | |
| 2008/0310602 | A1 | 12/2008 | Bhupati | |
| 2009/0061837 | A1* | 3/2009 | Chaudhri | G06F 3/0481 455/418 |
| 2009/0069056 | A1* | 3/2009 | Lee et al. | 455/566 |
| 2009/0265666 | A1 | 10/2009 | Hsieh | |
| 2010/0146437 | A1* | 6/2010 | Woodcock et al. | 715/806 |
| 2011/0081889 | A1* | 4/2011 | Gao | G06F 3/038 455/411 |
| 2012/0053887 | A1* | 3/2012 | Nurmi | 702/150 |
| 2012/0095979 | A1* | 4/2012 | Aftab | G06F 17/30867 707/706 |
| 2012/0253485 | A1* | 10/2012 | Weast et al. | 700/91 |
| 2012/0323933 | A1* | 12/2012 | He et al. | 707/749 |
| 2013/0050250 | A1* | 2/2013 | Brinda et al. | 345/619 |

FOREIGN PATENT DOCUMENTS

EP          2306262          4/2011

OTHER PUBLICATIONS

U.S. Appl. No. 13/152,691, filed Jun. 3, 2011, Tseng.
International Search Report and Written Opinion for International Application No. PCT/US2012/040979, dated Dec. 27, 2012.

* cited by examiner

*Primary Examiner* — Azizul Choudhury
(74) *Attorney, Agent, or Firm* — Baker Botts L.L.P.

(57) ABSTRACT

In one embodiment, receiving a first action from a user of a computing device, wherein the first action causes the computing device to power up while a screen of the computing device is locked; obtaining a plurality of dynamic information items relevant to the user of the computing device; and displaying at least one of the plurality of dynamic information items on the locked screen of the computing device.

20 Claims, 3 Drawing Sheets

DISPLAY DYNAMIC CONTENTS ON LOCKED SCREENS

TECHNICAL FIELD

This disclosure generally relates to displaying dynamic contents on the lock screens of mobile computing devices.

BACKGROUND

Figure 1:
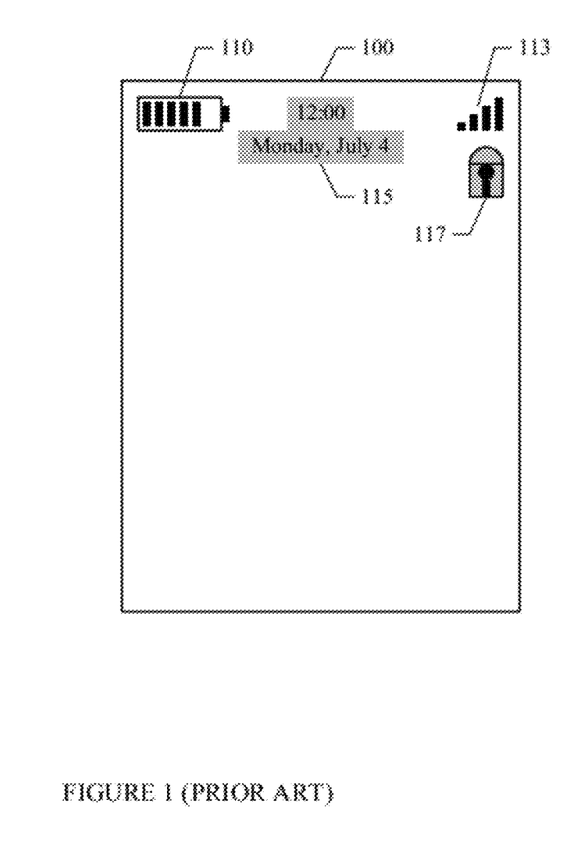
FIG. 1 (prior art) illustrates an example locked screen of a mobile device with static content displayed thereon.

The display screen of a computing device, such as a mobile device (e.g., mobile telephone, tablet computer, etc.), may be locked when the device is not in use for security reasons as well as to save power. For example, when a mobile telephone has not been used for some time, the telephone may automatically enter into a power-saving mode, where the screen of the telephone is darkened to save power and locked to prevent unauthorized usage or accidental input. While the screen of the mobile telephone is locked, some static information may be displayed on the locked screen. FIG. 1 illustrates an example locked screen 100 of a mobile telephone with some static information displayed thereon. For example, the static information may include a power indicator 110 indicating the current power level of the battery of the mobile telephone, a signal strength indicator 113 indicating the current strength level of the wireless signal, a time and date display 115, and an icon 117 indicating that the screen is currently locked. In addition, there may be a background image displayed on locked screen 100.

SUMMARY

This disclosure generally relates to displaying dynamic contents on the lock screens of computing devices. More specifically, when the screen of a mobile computing device is locked, dynamic information relevant to a user of the computing device is displayed on the locked screen of the computing device.

In particular embodiments, receiving a first action from a user of a computing device, wherein the first action causes the computing device to power up while a screen of the computing device is locked; obtain a plurality of dynamic information items relevant to the user of the computing device; and display at least one of the plurality of dynamic information items on the locked screen of the computing device.

These and other features, aspects, and advantages of the disclosure are described in more detail below in the detailed description and in conjunction with the following figures.

DESCRIPTION OF EXAMPLE EMBODIMENTS

This disclosure is now described in detail with reference to a few embodiments thereof as illustrated in the accompanying drawings. In the following description, numerous specific details are set forth in order to provide a thorough understanding of this disclosure. However, this disclosure may be practiced without some or all of these specific details. In other instances, well known process steps and/or structures have not been described in detail in order not to unnecessarily obscure this disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

The display screen of a computing device, such as a mobile device (e.g., mobile or smart telephone, tablet computer, etc.), may be locked when the device is not in use for security reasons, to prevent inadvertent actions, as well as to save power. For example, when a mobile telephone has not been used for some time, the telephone may automatically enter into a power-saving mode, where the screen of the telephone is darkened to save power and locked to prevent unauthorized usage. Alternatively, a user of the mobile telephone may manually lock the screen of the mobile telephone by, for example, pushing a preset key or button or performing a predefined gesture in connection with the telephone. In particular embodiments, while the screen of a computing device (e.g., a mobile or smart telephone) is locked, if the computing device is powered on (e.g., the screen of the device is lighted up), dynamic content relevant to the user of the computing device is displayed on the locked screen.

Figure 2:
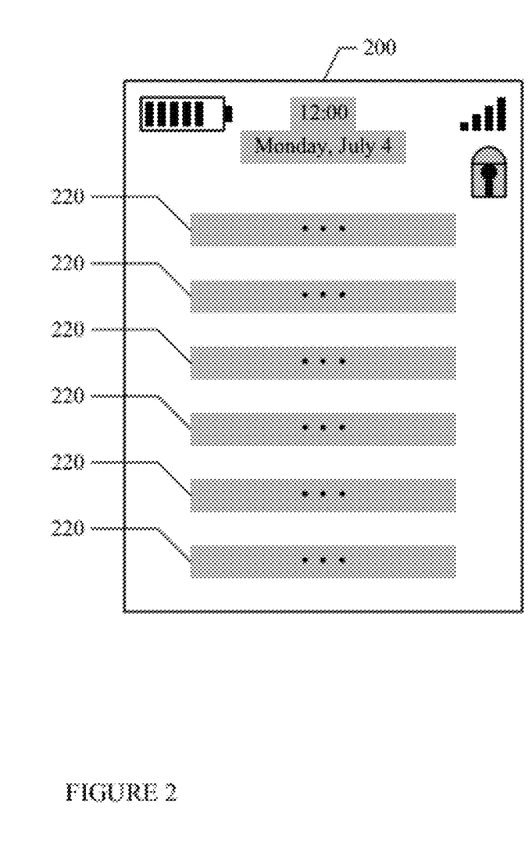
FIG. 2 illustrates an example locked screen of a mobile device with dynamic content displayed thereon.

FIG. 2 illustrates an example locked screen 200 of a mobile device with dynamic content displayed thereon. There may be multiple dynamic information items 220 displayed on locked screen 200. In particular embodiments, each item 220 may include text (e.g., title or summary) and/or image (e.g., thumbnail or icon) that describes the content of that item 220. The user may select a specific item 220 to further view detailed content of that item 220 and/or to interact with that item 220.

In particular embodiments, the user of the computing device is a member of a social-networking website, and at least some information items 220 are social information relevant to the user. A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. Such social-networking websites enable their members, who are commonly referred to as website users, to perform various social activities. For example, the social-networking website operated by Facebook, Inc. at www.facebook.com enables its users to communicate with their friends via emails, instant messages, or blog postings, organize social events, share photos, receive news of their friends or interesting events, play games, etc.

Figure 3:
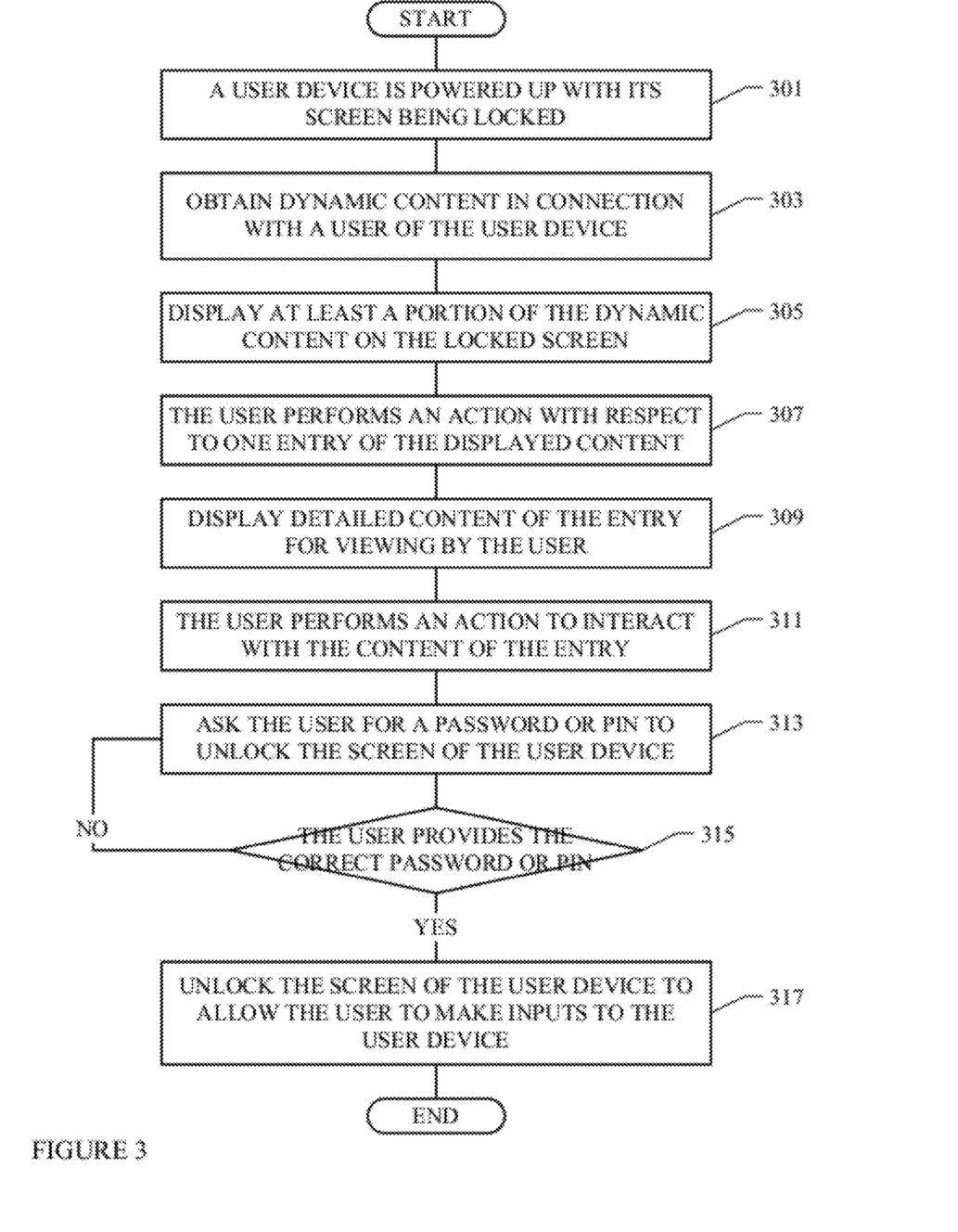
FIG. 3 illustrates an example method for displaying dynamic content on a lock screen.

FIG. 3 illustrates an example method for displaying dynamic content on a lock screen. Suppose that a user device (e.g., a mobile or smart telephone, a tablet or netbook computer, etc.) is in a power-saving mode, with its display screen locked and darkened. A user may perform an action to the user device that causes the user device to power up, as illustrated in STEP 301. For example, the user may push a key or button or touch the touch-screen of the user device. The screen of the user device is lighted up, but is still locked.

Dynamic content relevant to the user may be obtained, as illustrated in STEP 303. There are various means for the user device to obtain dynamic information. In network communications, there are generally two ways to send information in the form of a communication from one device to another device: push and pull. With push technology, the request for the communication transaction is initiated by the sending device. That is, the sending device "pushes" the communication (i.e., information), so to speak, to the receiving device. In this case, the sending device may be considered the active party and the receiving device may be considered the passive party in the transaction. In contrast, with pull technology, the request for the communication transaction is initiated by the receiving device. That is, the receiving device "pulls" the communication (i.e., information), so to speak, from the sending device. In this case, the sending device may be considered the passive party and the receiving device may be considered the active party in the transaction.

In particular embodiments, information relevant to the user may be pushed to the user device from time to time (e.g., by a server), even while the user device is in the power-saving mode. Alternatively or in addition, the user device may pull information relevant to the user from time to time (e.g., from a server), even while the user device is in the power-saving mode. For example, while the user device is in the power-saving mode, it may wake up periodically according to a predefined schedule (e.g., every half hour) and pull the relevant information from the server. In either case, upon receiving the information, the user device may store the information locally on the user device.

In particular embodiments, upon powering up, the user device may dynamically collect the information relevant to the user. In some cases, if the user device has just collected the relevant information recently (e.g., within the past ten minutes), then the user device may not need to re-collect the information again so soon and may use the information already collected.

Various types of information may be dynamically collected, and the present disclosure contemplates any applicable type of information. For example and without limitation, the dynamic information may include communications to the user (e.g., emails or short messages, voice mails, missed telephone calls, chats, etc.), news or web or other types of RSS (Really Simple Syndication) feeds, information on establishments (e.g., restaurants, shops, etc.) or locations (e.g., parks, attractions, etc.) near where the user device and thus the user are currently located, social information (e.g., friend activities or requests, social events, social calendars, etc.), and so on. The dynamic information may be collected from various information sources, and the present disclosure contemplates any applicable information source. For example and without limitation, the dynamic information may be collected from information stored locally on the user device (e.g., information pulled by or pushed to the user device, information inputted to the user device by the user, etc.), information stored in connection with a social-networking website of which the user is a member, information publically available on the Internet, news feeds, and so on. The collected information items may be ranked based on various factors, such as social factors with respect to the user, the current time, the current location of the user device, and so on. In addition, the ranking of certain information may be artificially boosted. For example, when the user device and thus the user are at a shopping mall, the ranking of information on the stores in the mall may be artificially boosted as such information may be more useful to the user at that particular time. Collecting and ranking information relevant to a user is described in more detail in U.S. patent application Ser. No. 13/152,691, filed on 3 Jun. 2011, entitled Überfeed, which is hereby incorporated by reference in its entirety and for all purposes.

In particular embodiments, when news feeds are incorporated in the information collected for the user, the news items in the feeds may be dynamically compiled for the user (e.g., based on the user's interests, the time when the news items are compiled, the location of the user, etc.). Dynamically compiling news items into a news feed for a user is described in more detail in U.S. Pat. No. 7,669,123, issued on 23 Feb. 2010, entitled Dynamically Providing a News Feed About a User of a Social Network, which is hereby incorporated by reference in its entirety and for all purposes.

In particular embodiments, one or more information items may be displayed on the locked screen of the user device, as illustrated in STEP 305. For example, the displayed information items may correspond to the top-ranked information relevant to the user. Each item may include text and/or image that briefly describes or summarizes the content of the information. For example, for an email message, the sender's name and the title of the message may be included in the item. For a news article, the title and the publisher of the article may be included in the item. For a missed telephone call, the caller's number and the time of the call may be included in the item.

In particular embodiments, related or similar information items may be grouped together, and a group of similar information items may be collapsible to be displayed as a single entry. This way, more information items may be displayed within a limited amount of space to increase information density. This may be especially useful when the screen of the user device is relatively small. For example, a single entry for missed telephone calls may include multiple missed telephone calls. A single entry for email messages may include multiple email messages. A single entry for news items may include multiple news items relating to the same subject matter. A single entry for friend requests may include multiple friend requests. A single entry for notifications may include multiple notifications pushed to the user device.

The user may expand or collapse a group of related or similar information items. For example, when a group of information items is displayed in the collapsed form (i.e., as a single entry), an icon (e.g., a plus sign "+") may be displayed next to the entry. The user may tap or click on the plus icon to expand the group into multiple entries to view the individual information items included in the group. On the other hand, when a group of information items is displayed in the expanded form (i.e., as multiple entries), another icon (e.g., a minus sign "−") may be displayed next to the group. The user may tap or click on the minus icon to collapse the group back to a single entry. In particular embodiments, expanding or collapsing a group of information items may be done while the screen of the user device is still locked.

In particular embodiments, the user may perform an action to the user device in connection with a specific information item, as illustrated in STEP 307, which causes the detailed content, and/or an expanded view, of that item to be displayed on the locked screen for viewing by the user, as illustrated in STEP 309. In one implementation, the user may make a swipe gesture near the touch screen of the user device, swiping along a particular information item. This swiping gesture may cause the detailed content of the information item to be displayed on the locked screen. For example, if the information item is an email message, swiping along the item may cause the message body to be displayed on locked screen. If the information item is a news article from a news feed, swiping along the item may cause the content of the article to be displayed on the locked screen. If the information item is an online game that the user plays with other players, swiping along the item may cause the current status or player actions to be displayed on the locked screen.

In addition, there may be user-interface components displayed together with the detailed content of the information item that enables the user to further interact with the item. For example, if the information item is an email message, there may be icons corresponding to actions such as "reply", "forward", or "delete", from which the user may select a specific action to perform with the email message. If the information item is a news article, there may be icons corresponding to actions such as "comment", "like", or "email to a friend", from which the user may select a specific action to perform with the news article. If the information is a missed telephone call, there may be icons corresponding to actions such as "voice mail" or "call back", from which the user may select a specific action to perform with the missed telephone call. If the information item is an online game, there may be icons corresponding to specific actions the user may take in response to actions performed by other players.

In particular embodiments, the user may perform an action to the user device (e.g., selecting one of the user-interface components provided together with the detailed content of the information item) to further interact with the information item, as illustrated in STEP 311. A user device, when its screen is locked, may or may not require a security code (e.g., a password or a Personal identification Number (PIN)) to unlock the screen. Some users may choose to protect their user devices from unauthorized usage by requiring security codes to unlock the devices' screens in order to interact with the devices, while other users may not.

In particular embodiments, if the user device does not require a security code to unlock the screen, a single gesture (e.g., a swipe) from the user may cause both the detailed content of the information item to be displayed and the screen of the device to be unlocked. In this case, the user does not need to perform another gesture explicitly to unlock the screen. The user may interact with the detailed content of the information item (e.g., reply an email message, comment on a news article, etc.) directly, without any hindrance.

On the other hand, if the user device does require a security code to unlock the screen, when the user performs an action to the user device to further interact with the detailed content of the information item (e.g., reply an email message, comment on a news article, etc.), the user device prompts the user for a security code (e.g., password or PIN) to unlock the screen, as illustrated in STEP 313. If the user is able to provide the correct security code, as illustrated in STEP 315 (YES), then the screen of the user device is unlocked so that the user can provide inputs to the user device (e.g., composing a reply email or a comment to a news article, making a phone call, playing a game, etc.), as illustrated in STEP 317. However, if the user is unable to provide the correct security code, as illustrated in STEP 315 (NO), then the screen of the user device remains locked, and the user cannot further interact with the detailed content of the information item. The user may be given a number of chances (e.g., up to ten tries) to provide the correct security code. If the user is able to enter the correct security code during a subsequent attempt, the screen of the user device is unlocked. Otherwise, the screen of the user device remains unlocked.

In this case, a security code is used to prevent unauthorized usage of the user device. However, the user is prompted for the correct security code in order to unlock the screen of the user device only when necessary (e.g., when the user desires to interact with an information item and provide user input to the information item, instead of merely viewing the content of the information item). Thus, asking the user for the security code to unlock the screen of the user device is delayed as much as possible. If the user only wishes to view the content of the information items instead of interacting with them, then no security code is required, and the content of the information items may be displayed on the locked screen of the user device.

In some embodiments, even when the user device requires a security code to unlock the screen, the user may still be allowed to interact with detailed content of a specific information item displayed on the locked screen without having to providing the correct security code. For example, if a email or SMS message is displayed on the locked screen, the user may be allowed not only to view the content of the message but to replay to that message without having to provide the correct security code to unlock the screen first. However, if the user wishes to perform actions with the user device not in connection with any information item displayed on the locked screen (e.g., browsing the web, making a phone call, etc.), the user is asked to provide the correct security code to unlock the screen first.

By not asking the user for the security code to unlock the user device unless it is necessary, the above embodiments allow the user to view information content (e.g., emails, news, missed calls, etc.) without the cumbersome process of having to unlock the user device. The user only needs to unlock the user device when performing some action that invokes the user's identity, such as sending messages, commenting on wall posts of members of the social-networking website, or uploading photographs.

Figure 4:
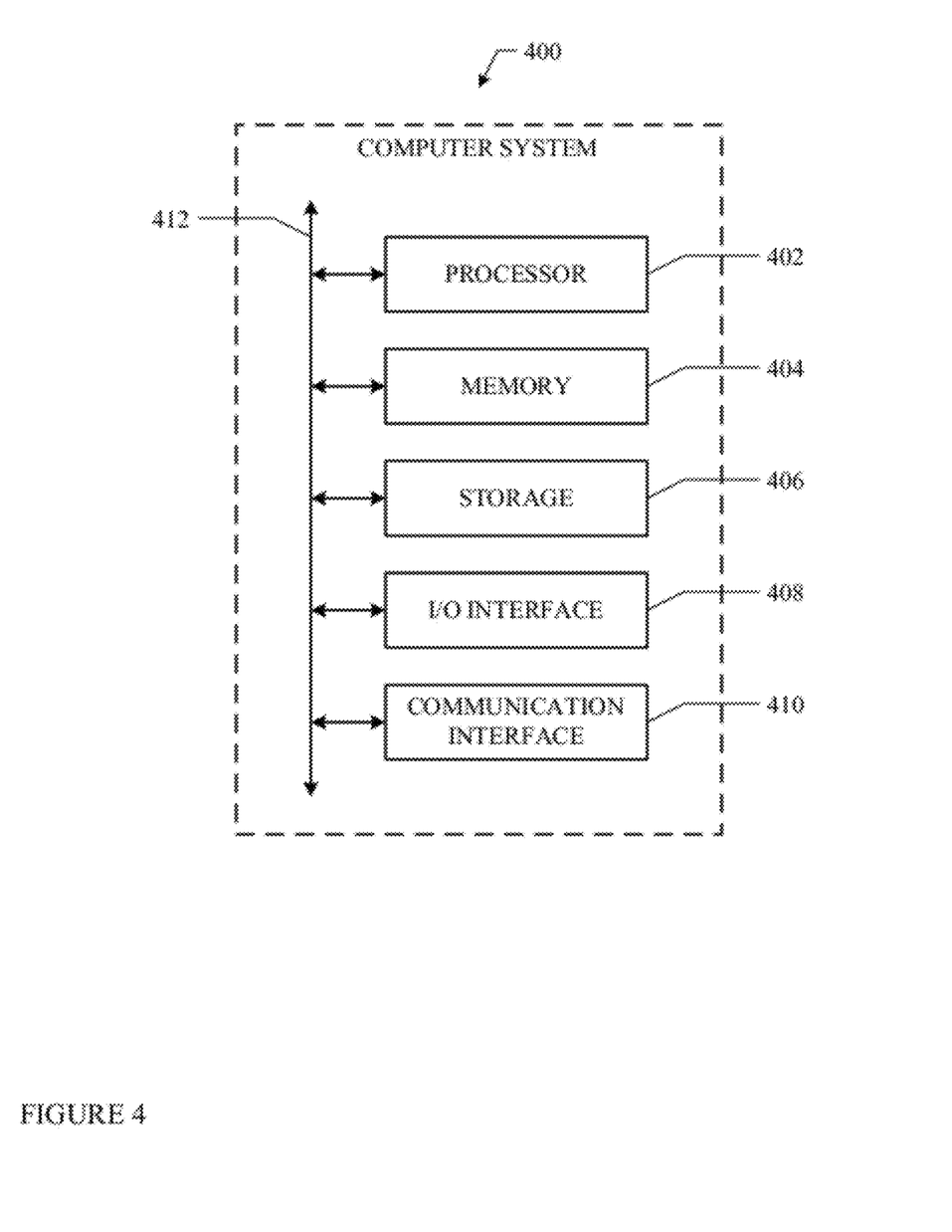
FIG. 4 illustrates an example computer system.

Particular embodiments may be implemented on one or more computer systems. For example, the method illustrated in FIG. 3 may be implemented as computer software. FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 402 (such as, for example, one or more internal registers or caches), one or more portions of memory 404, one or more portions of storage 406, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing device, obtaining a plurality of dynamic information items relevant to a user of the computing device;
   by the computing device, ranking the plurality of dynamic information items based at least in part on one or more social factors of the user stored on a social-networking system;
   by the computing device, displaying, based at least in part on the ranking, at least one of the plurality of dynamic information items on a locked screen of the computing device; and
   by the computing device, in response to user input selecting the at least one displayed dynamic information item being received at the computing device, displaying, on the locked screen of the computing device, detailed content associated with the respective dynamic information item and a user-interface component for performing one or more actions with respect to the displayed dynamic information item, the locked screen being configured to:
      allow the user to perform the actions via the user-interface component if the selected dynamic information item is in a first set of the dynamic information items without unlocking the locked screen; and
      prevent the user from performing the actions via the user-interface component if the selected dynamic information item is in a second set of the dynamic information items.

2. The method of claim 1, further comprising:
   by the computing device, receiving user input indicating an action from the user of the computing device with respect to the detailed content of the selected dynamic information item displayed on the locked screen of the computing device, wherein the selected dynamic information item is in the second set;
   by the computing device, prompting the user of the computing device to provide a security code to unlock the screen of the computing device; and
   if the user provides a correct security code, then, by the computing device, unlocking the screen of the computing device.

3. The method of claim 2, wherein the action is an interaction with the detailed content of the selected dynamic information item.

4. The method of claim 1, wherein the computing device is a mobile telephone.

5. The method of claim 1, wherein:
   the user of the computing device is a member of a social-networking system; and
   the plurality of dynamic information items comprises one or more social-information items relevant to the user of the computing device.

6. The method of claim 1, wherein:
   the user of the computing device is a member of a social-networking system; and
   the at least one of the plurality of dynamic information items displayed on the locked screen of the computing device comprises at least one top-ranked dynamic information item.

7. The method of claim 1, wherein the social factors of the user stored on the social-networking system comprise:
   a graph comprising:
      a plurality of nodes and edges connecting the nodes;
      at least one node in the graph corresponds to the user;
      at least one node in the graph corresponds to an entity associated with at least one of the plurality of dynamic information items; and
      a relationship between the user and the entity comprises at least one of the nodes corresponding to the user being connected to at least one of the nodes corresponding to the entity by one or more edges.

8. The method of claim 7, wherein the ranking of the dynamic information items comprises determining a degree of relevance to the user based at least in part on a closeness of the relationship.

9. The method of claim 7, wherein the ranking of the dynamic information items further comprises determining a degree of relevance to the user based at least in part on a closeness of a location associated with the entity to a current location of the user.

10. The method of claim 7, wherein the entity is another user of the social-networking system.

11. A system comprising:
    a memory comprising instructions executable by one or more processors; and
    the one or more processors coupled to the memory and operable to execute the instructions, the one or more processors being operable when executing the instructions to:
       obtain a plurality of dynamic information items relevant to a user of the system;
       rank the plurality of dynamic information items based at least in part on one or more social factors of the user stored on a social-networking system;
       display, based at least in part on the ranking, at least one of the plurality of dynamic information items on a locked screen of the system; and
       in response to user input selecting the at least one displayed dynamic information item being received at the computing device, display, on the locked screen of the computing device, detailed content associated with the respective dynamic information item and a user-interface component for performing one or more actions with respect to the displayed dynamic information item, the locked screen being configured to:
          allow the user to perform the actions via the user-interface component if the selected dynamic information item is in a first set of the dynamic information items without unlocking the locked screen; and
          prevent the user from performing the actions via the user-interface component if the selected dynamic information item is in a second set of the dynamic information items.

12. The system of claim 11, wherein the one or more processors are further operable when executing the instructions to:
    receive user input indicating an action from the user of the system with respect to the detailed content of the selected dynamic information item displayed on the locked screen of the system, wherein the selected dynamic information item is in the second set;
    prompt the user of the system to provide a security code to unlock the screen of the system; and if the user provides a correct security code, then unlock the screen of the system.

13. The system of claim 12, wherein the action is an interaction with the detailed content of the selected dynamic information item.

14. The system of claim 11, wherein:
the user of the system is a member of a social-networking system; and
the plurality of dynamic information items comprises one or more social-information items relevant to the user of the system.

15. The system of claim 11, wherein:
the user of the system is a member of a social-networking system; and
the at least one of the plurality of dynamic information items displayed on the locked screen of the system comprises at least one top-ranked dynamic information item.

16. The system of claim 11, wherein the social factors of the user stored on the social-networking system comprise:
a graph comprising:
a plurality of nodes and edges connecting the nodes;
at least one node in the graph corresponds to the user;
at least one node in the graph corresponds to an entity associated with at least one of the plurality of dynamic information items; and
a relationship between the user and the entity comprises at least one of the nodes corresponding to the user being connected to at least one of the nodes corresponding to the entity by one or more edges.

17. The system of claim 16, wherein the processors are further operable to determine a degree of relevance to the user based on a closeness of the relationship.

18. The system of claim 16, wherein the processors are further operable to determine a degree of relevance to the user based at least in part on a closeness of a location associated with the entity to a current location of the user.

19. The system of claim 16, wherein the entity is another user of the social-networking system.

20. One or more computer-readable non-transitory storage media embodying software operable when executed by a computer system to:
obtain a plurality of dynamic information items relevant to the user of the computer system;
rank the plurality of dynamic information items based at least in part on one or more social factors of the user stored on a social-networking system;
display, based at least in part on the ranking, at least one of the plurality of dynamic information items on the locked screen of the computer system; and
in response to user input selecting the at least one displayed dynamic information item being received at the computing device, display, on the locked screen of the computing device, detailed content associated with the respective dynamic information item and a user-interface component for performing one or more actions with respect to the displayed dynamic information item, the locked screen being configured to:
allow the user to perform the actions via the user-interface component if the selected dynamic information item is in a first set of the of the dynamic information items without unlocking the locked screen; and
prevent the user from performing the actions via the user-interface component if the selected dynamic information item is in a second set of the dynamic information items.

* * * * *